US010206110B1

(12) United States Patent
Shavell et al.

(10) Patent No.: US 10,206,110 B1
(45) Date of Patent: Feb. 12, 2019

(54) TECHNIQUES FOR NETWORK SECURITY

(71) Applicant: Symantec Corporation, Mountain View, CA (US)

(72) Inventors: Michael Shavell, Merrimack, NH (US); Lei Gu, Bedford, MA (US); Ilya Sokolov, Boston, MA (US); Kevin Jiang, San Mateo, CA (US)

(73) Assignee: Symantec Corporation, Mountain View, CA (US)

( * ) Notice: Subject to any disclaimer, the term of this patent is extended or adjusted under 35 U.S.C. 154(b) by 98 days.

(21) Appl. No.: 15/211,707

(22) Filed: Jul. 15, 2016

(51) Int. Cl.
| | |
|---|---|
| *H04W 12/08* | (2009.01) |
| *H04L 12/741* | (2013.01) |
| *H04W 4/02* | (2018.01) |
| *H04W 40/24* | (2009.01) |
| *H04W 12/02* | (2009.01) |
| *H04W 84/12* | (2009.01) |
| *H04W 88/08* | (2009.01) |
| *H04W 88/02* | (2009.01) |

(52) U.S. Cl.
CPC ........... *H04W 12/08* (2013.01); *H04L 45/745* (2013.01); *H04W 4/026* (2013.01); *H04W 12/02* (2013.01); *H04W 40/244* (2013.01); *H04W 84/12* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 9,491,237 B1 * | 11/2016 | Garg | H04W 4/021 |
| 2013/0115915 A1 * | 5/2013 | Tipton | H04W 12/08 |
| | | | 455/411 |
| 2013/0329631 A1 * | 12/2013 | Alam | H04W 52/362 |
| | | | 370/328 |
| 2015/0215737 A1 * | 7/2015 | Shin | H04W 4/021 |
| | | | 455/456.1 |
| 2017/0230856 A1 * | 8/2017 | Vamaraju | H04W 24/10 |

* cited by examiner

*Primary Examiner* — Suhail Khan
(74) *Attorney, Agent, or Firm* — Holland & Hart LLP

(57) ABSTRACT

Techniques are described for network security. One method includes identifying a network-access boundary associated with a network for a location, generating a credential for the network based at least in part on the identified network-access boundary, receiving a request from a user equipment (UE) to access the network associated with the location, and transmitting the credential associated with the network based at least in part on the network-access boundary.

20 Claims, 10 Drawing Sheets

TECHNIQUES FOR NETWORK SECURITY

BACKGROUND

The following relates generally to wireless network security, and more specifically to techniques for network security. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include an AP that may communicate with one or more user equipment (UEs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a UE may communicate with an associated AP via DL and UL. The DL (or forward link) may refer to the communication link from the AP to the UE, and the UL (or reverse link) may refer to the communication link from the UE to the AP.

Further, public Wi-Fi access zones, are increasingly common to users for connecting to the Internet in public places via a wireless connection. These zones, also referred to as "Hotspots," enable a user to obtain access to the Internet, in many cases via a high-speed, broadband connection. A user may connect to the Internet via a UE with wireless capability or other wireless IP-enabled device by accessing an AP in the public space, such as a cafe, airport, hotel, library, etc., or other Wi-Fi enabled zone, the AP component is owned or operating by an entity responsible for maintaining the zone. Internet access is provided by a wireless Internet service provider ("WISP"). Before the user can access the Internet, the user must first connect to the AP via a wireless connection using a Wi-Fi signal. There are, however, security issues associated with the public Wi-Fi zones. One is that the AP at the public Wi-Fi zone is unsecure. This is a highly exposed connection, especially in crowded Wi-Fi zones, such as a busy cafe or airport terminal. Specifically, network traffic transmitted between the UE and the AP are typically unprotected and exposed to interception. Sensitive network traffic such as e-mail passwords and content, personal information, credit card information, instant message content, file server logins, and so on can be intercepted by network "sniffers", and via rogue APs, among other known techniques.

SUMMARY

The described techniques relate to improved methods, systems, devices, or apparatuses that support techniques for network security.

According to at least one embodiment, a method of wireless network security is described. The method may include identifying a network-access boundary associated with a network for a location, generating a credential for the network based at least in part on the identified network-access boundary, receiving a request from a user equipment (UE) to access the network associated with the location, and transmitting the credential associated with the network based at least in part on the network-access boundary.

According to at least one embodiment, an apparatus for wireless network security is described. The apparatus may include a processor, memory in electronic communication with the processor, and instructions stored in the memory. The instructions may be operable to cause the processor to identify a network-access boundary associated with a network for a location, generate a credential for the network based at least in part on the identified network-access boundary, receive a request from a UE to access the network associated with the location, and transmit the credential associated with the network based at least in part on the network-access boundary.

According to at least one embodiment, a non-transitory computer readable medium for wireless network security is described. The non-transitory computer-readable medium may include instructions operable to cause a processor to identify a network-access boundary associated with a network for a location, generate a credential for the network based at least in part on the identified network-access boundary, receive a request from a UE to access the network associated with the location, and transmit the credential associated with the network based at least in part on the network-access boundary.

Some embodiments of the method, apparatus, and non-transitory computer-readable medium described above may further include processes, features, means, or instructions for determining a location of the UE. Some embodiments of the method, apparatus, and non-transitory computer-readable medium described above may further include processes, features, means, or instructions for detecting that the location of the UE may be external to the network-access boundary. Some embodiments of the method, apparatus, and non-transitory computer-readable medium described above may further include processes, features, means, or instructions for determining whether the UE may be external to the network-access boundary for a predetermined duration based at least in part on the location of the UE.

Some embodiments of the method, apparatus, and non-transitory computer-readable medium described above may further include processes, features, means, or instructions for discontinuing the credential associated with the network-access boundary based at least in part on determining that the UE may be external to the network-access boundary for a period exceeding the predetermined duration.

In some embodiments of the method, apparatus, and non-transitory computer-readable medium described above, the location of the UE may be determined based at least in part on global positioning system (GPS) coordinates of the UE.

Some embodiments of the method, apparatus, and non-transitory computer-readable medium described above may further include processes, features, means, or instructions for generating a plurality of credentials associated with the network for the network-access boundary. Some embodiments of the method, apparatus, and non-transitory computer-readable medium described above may further include processes, features, means, or instructions for determining a schedule associated with the plurality of credentials. Some embodiments of the method, apparatus, and non-transitory computer-readable medium described above may further include processes, features, means, or instructions for filtering the credential for the network based at least in part on the schedule.

Some embodiments of the method, apparatus, and non-transitory computer-readable medium described above may further include processes, features, means, or instructions for determining a plurality of network-access boundaries of one or more beacons associated with a location. Some embodiments of the method, apparatus, and non-transitory computer-readable medium described above may further include processes, features, means, or instructions for generating a plurality of credentials for each network-access boundary based at least in part on a perimeter of the network-access boundary.

In some embodiments of the method, apparatus, and non-transitory computer-readable medium described above, one or more of the network-access boundaries overlap. Some embodiments of the method, apparatus, and non-transitory computer-readable medium described above may further include processes, features, means, or instructions for exchanging the plurality of credentials between the network-access boundaries of the one or more beacons based at least in part on a predetermined rule. In some embodiments of the method, apparatus, and non-transitory computer-readable medium described above, the predetermined rule comprises: any of a predetermined sequence, or a predetermined duration, or a combination thereof.

Some embodiments of the method, apparatus, and non-transitory computer-readable medium described above may further include processes, features, means, or instructions for encrypting each credential prior to the exchanging based at least in part on a security protocol. Some embodiments of the method, apparatus, and non-transitory computer-readable medium described above may further include processes, features, means, or instructions for performing a measurement procedure of one or more beacons. Some embodiments of the method, apparatus, and non-transitory computer-readable medium described above may further include processes, features, means, or instructions for transmitting a measurement report to an access point, wherein the report may be based at least in part on the measurement procedure. Some embodiments of the method, apparatus, and non-transitory computer-readable medium described above may further include processes, features, means, or instructions for modifying a perimeter associated with the one or more network-access boundaries based at least in part on the measurement report.

In some embodiments of the method, apparatus, and non-transitory computer-readable medium described above, the credential may be a Wi-Fi Protected Access-2 (WPA2) credential. In some embodiments of the method, apparatus, and non-transitory computer-readable medium described above, the network may be a wireless local area network (WLAN).

DETAILED DESCRIPTION

Maintaining security for networked transmissions of data and content to a UE includes performing discovery and connection operations that are non-interruptible and cannot be captured by non-authorized entities. Public Wi-Fi hotspots enable users to obtain access to the Internet. A user may connect to the Internet via a UE with wireless capability or other wireless IP-enabled device by accessing an AP in the public space, such as a cafe, airport, hotel, library, etc., or other Wi-Fi enabled zone. Internet access is provided by a wireless Internet service provider ("WISP"). Before the user can access the Internet, the user must first connect to the AP via a wireless connection using a Wi-Fi signal. There are, however, security issues associated with the public Wi-Fi zones. One is that the AP at the public Wi-Fi zone is unsecure. This is a highly exposed connection, especially in crowded Wi-Fi zones, such as a busy cafe or airport terminal. Specifically, network traffic transmitted between the UE and the AP are typically unprotected and exposed to interception. Sensitive network traffic such as e-mail passwords and content, personal information, credit card information, instant message content, file server logins, and so on can be intercepted by network "sniffers", and via rogue APs, among other known techniques. However, by utilizing beacons throughout a Wi-Fi hotspot zone (i.e., network-access boundary) may increase security of the Wi-Fi hotspot zone. The present disclosure provides a location specific WPA2 credential allowing network traffic to be encrypted independently and preventing both intrusion and restricting other endpoint devices from sniffing the user's traffic.

Figure 1:
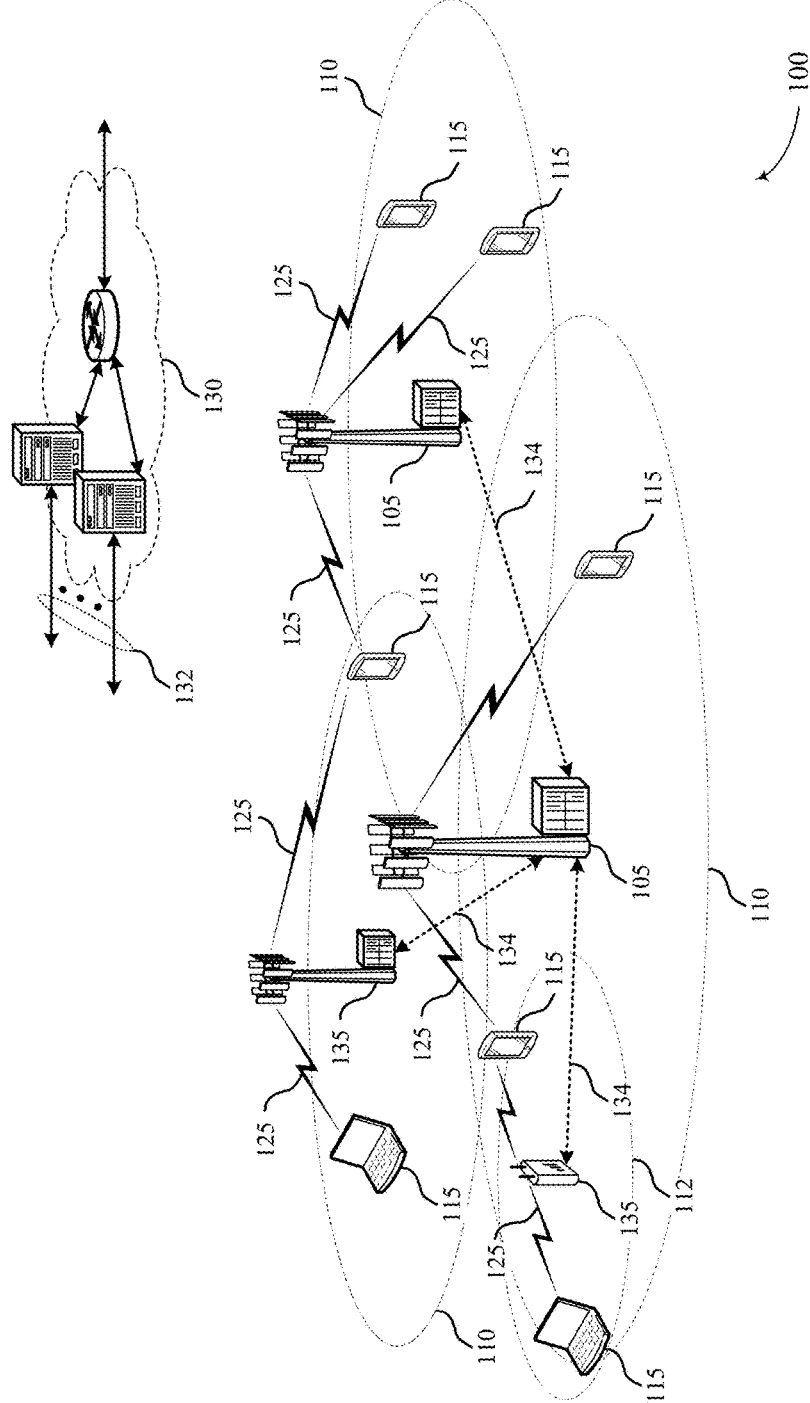
FIG. 1 illustrates an example of a wireless communication system that supports techniques for network security in accordance with aspects of the present disclosure.

FIG. 1 illustrates an example of a wireless communication system 100 that supports techniques for network security in accordance with aspects of the present disclosure. The wireless communication system 100 may include access points (APs) 105, UEs 115, beacons 135 (e.g., a type of base station 105), and a core network 130. The core network 130 may provide user authentication, access authorization, tracking, Internet Protocol (IP) connectivity, and other access, routing, or mobility functions. The APs 105 and beacons 135 may interface with the core network 130 through backhaul links 134 (e.g., S1, etc.) and may perform radio configuration and scheduling for communication with the UEs 115, or may operate under the control of an access point controller (not shown). In various examples, the APs 105 or beacons 135 may communicate, either directly or indirectly (e.g., through core network 130), with each other over backhaul links 132 (e.g., X1, etc.), which may be wired or wireless communication links.

The APs 105 or beacons 135 may wirelessly communicate with the UEs 115 via one or more AP or beacon antennas.

Each of the AP 105 or beacons 135 sites may provide communication coverage for a respective geographic coverage area 110. In some embodiments, an AP 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for an AP 105 may be divided into sectors making up a portion of the coverage area (not shown). The wireless communication system 100 may include APs 105 of different types (e.g., macro or small cell base stations). There may be overlapping geographic coverage areas 110 for different technologies.

Although not shown in FIG. 1, a UE 115 may be located in the intersection of more than one geographic coverage area 110 and may associate with more than one AP 105 and/or beacon 135. A single AP 105 and an associated set of UEs 115 may be referred to as a basic service sets (BSS). An extended service set (ESS) is a set of BSSs. A distribution system (not shown) may be used to connect APs 105 in an ESS. In some cases, the geographic coverage area 110 of an AP 105 may be divided into sub-coverage areas 112. In some embodiments, the wireless communication system 100 may include a WLAN network that may include APs 105 of different types (e.g., metropolitan area, home network, etc.), with varying and overlapping geographic coverage areas 110. Two UEs may also communicate directly via a direct wireless link regardless of whether both UEs 115 are in the same geographic coverage area 110. Examples of direct wireless links may include Wi-Fi Direct connections, Wi-Fi Tunneled Direct Link Setup (TDLS) links, and other group connections. UEs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other embodiments, peer-to-peer connections or ad hoc networks may be implemented within the WLAN network.

The wireless communication system 100 may support synchronous or asynchronous operation. For synchronous operation, the AP 105 and beacons 135 may have similar frame timing, and transmissions from different APs 105 or beacons 135 may be approximately aligned in time. For asynchronous operation, the AP 105 or beacons 135 may have different frame timing, and transmissions from different APs 105 or beacons 135 may not be aligned in time. The techniques described herein may be used for either synchronous or asynchronous operations.

In some embodiments, a UE 115 (or an AP 105 and/or beacon 135) may be detectable by a central AP 105, but not by other UEs 115 in the geographic coverage area 110 of the central AP 105. For example, one UE 115 may be at one end of the geographic coverage area 110 of the central AP 105 while another UE 115 may be at the other end. Thus, both UE s 115 may communicate with the AP 105, but may not receive the transmissions of the other. This may result in colliding transmissions for the two UE s 115 in a contention based environment (e.g., CSMA/CA) because the UEs 115 may not refrain from transmitting on top of each other. A UE 115 whose transmissions are not identifiable, but that is within the same geographic coverage area 110 may be known as a hidden node. CSMA/CA may be supplemented by the exchange of a request to send (RTS) packet transmitted by a sending UE 115 (or AP 105 and/or beacon 135) and a clear to send (CTS) packet transmitted by the receiving UE 115 (or AP 105 and/or beacon 135). This may alert other devices within range of the sender and receiver not to transmit for the duration of the primary transmission. Thus, RTS/CTS may help mitigate a hidden node problem.

In some embodiments, the UEs 115 may be dispersed throughout the wireless communication system 100, and each UE 115 may be stationary or mobile. A UE 115 may, additionally or alternatively, include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) channels, from an AP 105 or beacon 135 to a UE 115, or uplink (UL) channels, from a UE 115 to an AP 105 or beacon 135. The downlink channels may, additionally or alternatively, be referred to as forward link channels, while the uplink channels may, additionally or alternatively, be referred to as reverse link channels.

In some embodiments, the wireless communication system 100 may include Wi-Fi Protected Access 2. The Wi-Fi Protected Access 2 and WPA2 marks indicate that a product has successfully completed testing under the Wi-Fi Alliances Wi-Fi Protected Access 2 certification program for wireless network security features. The features tested and certified through the WPA2 program provide stronger data protection and network access control that the features tested and certified through the Wi-Fi Protected Access (WPA) program. They provide enterprise and consumer Wi-Fi users with a high level of assurance that only authorized users can access their wireless networks. Based on the ratified IEEE 802.11i standard, the advanced security protocol provides government grade security by implementing the National Institute of Standards and Technology (NIST) FIPS 140-2 compliant AES encryption algorithm and 802.1X-based authentication. There are two versions of certification available through the WPA2 program: WPA2-Personal, and WPA2-Enterprise. WPA2-Personal certifies a standard that protects unauthorized network access by utilizing a set-up password. WPA2-Enterprise certifies a standard that verifies network users through a server. The standard certified through WPA2 is backward compatible with the standard certified through WPA. Like the standard certified through WPA, the standard certified through WPA2 uses the 802.1X/EAP framework as part of the infrastructure that ensures centralized mutual authentication and dynamic key management and offers a pre-shared key for use in home and small office environments. This advanced security protocol is designed to secure all versions of 802.11 devices, including 802.11b, 802.11a, and 802.11g, multi-band and multi-mode.

In some embodiments, the wireless communication system 100 may include Wi-Fi Protected Access 2-Enterprise. The Wi-Fi Protected Access 2-Enterprise mark indicates that a product has successfully completed testing under the Wi-Fi Alliances Wi-Fi Protected Access 2 certification program and meets the criteria established to ensure stronger data protection for multiple users and large managed networks.

These criteria prevent unauthorized network access by verifying network users through an authentication server.

Figure 2:
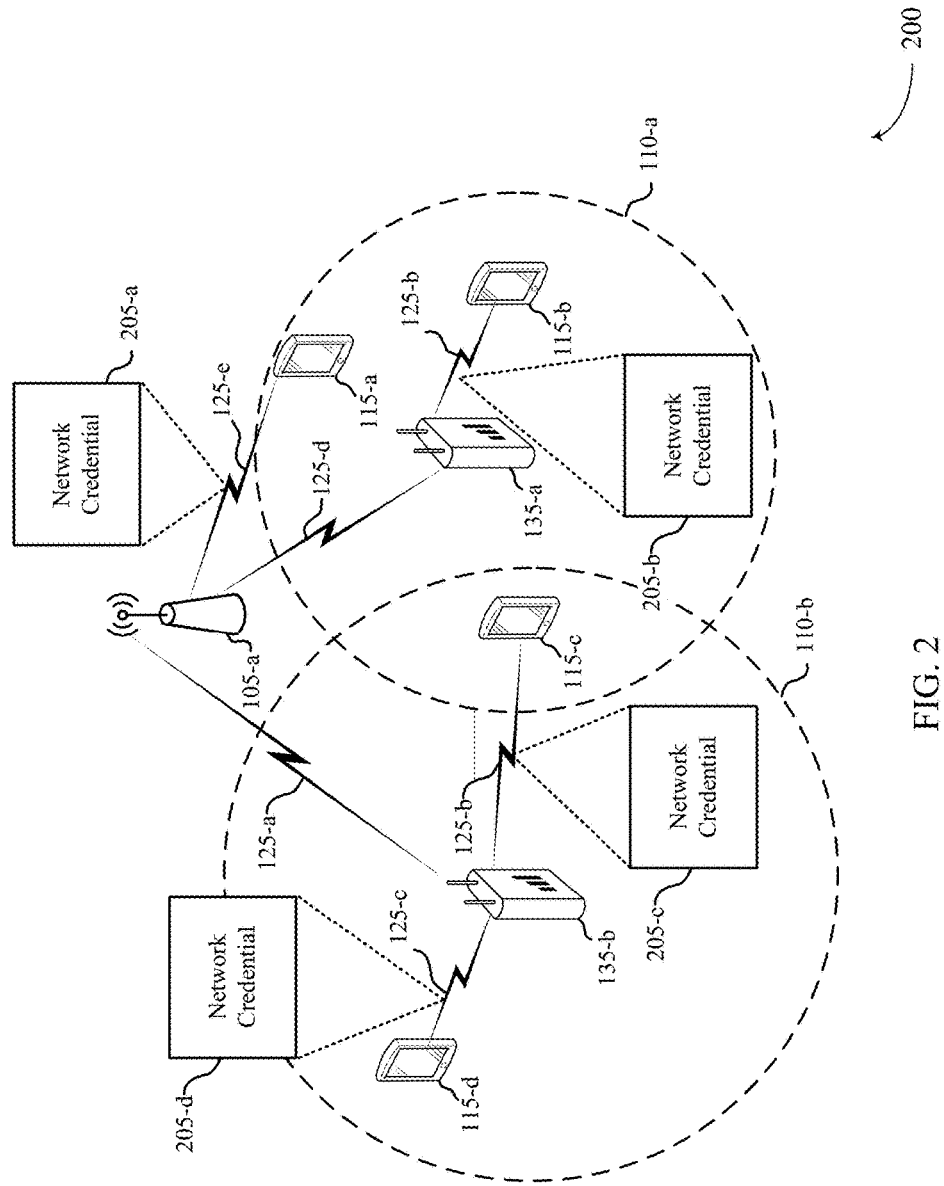
FIG. 2 illustrates an example of a wireless communication system that supports techniques for network security in accordance with aspects of the present disclosure.

FIG. 2 illustrates an example of a wireless communication system 200 that supports techniques for network security in accordance with aspects of the present disclosure. In one embodiment, the wireless communication system 200 may include a first set of wireless communication devices, e.g., a first UE 115-*a*, a second UE 115-*b*, and a third UE 115-*c*, which may be associated with a first beacon 135-*a*. In some embodiments, the wireless communication system 200 may include a second set of wireless communication devices, e.g., a fourth UE 115-*d*, which may be associated with a second beacon 135-*b*. The first UE 115-*a*, the second UE 115-*b*, the third UE 115-*c*, the fourth UE 115-*d*, the first beacon 135-*a*, and the second beacon 135-*b* may be examples of UE 115 and beacon 135 described with reference to FIG. 1.

In one embodiment, an AP 105-*a* may identify a network-access boundary associated with a network for a location. A network-access boundary may be, but is not limited to, a predetermined coverage area (i.e., geographic coverage area 110) in which an AP 105-*a* may provide access to a network (e.g., WLAN) accessible by one or more UEs 115 that are within the predetermined coverage area. For example, an AP located at a structure, e.g., a coffee shop may identify a network-access boundary as a perimeter of the structure. In some embodiments, the network-access boundary may have a predetermined radius (not shown) and/or variable radius. In some embodiments, the first beacon 135-*a* b may identify a first portion 110-*a* network-access boundary. The first portion 110-*a* network-access boundary may be associated with a first network credential 205-*a* and/or 205-*b*. In some embodiments, the second beacon 135-*b* may identify a second portion 110-*b* network-access boundary. The second portion 110-*b* network-access boundary may be associated with a second network credential 205-*c* and/or 205-*d*.

In one embodiment, an AP 105-*a* may determine a plurality of network-access boundaries, e.g., the first portion 110-*a* network-access boundary and the second portion 110-*b* network-access boundary, associated with one or more beacons at a location. In some embodiments, the plurality of network-access boundaries may be determined based at least in part on Wi-Fi trilateration. As a result, a UE may receive network access credential from a beacon associated with a coverage area that the UE is located within. The AP 105-*a* may generate a plurality of credentials, e.g., WPA2 credentials, for each network-access boundary based at least in part on a perimeter of the network-access boundary. For example, the AP 105-*a* may generate network credential 205-*a* based at least in part on a perimeter associated with the first portion 110-*a* network-access boundary. In further embodiments, the AP 105-*a* may generate a network credential based at least in part on a perimeter associated with the second portion 110-*b* network-access boundary. In some embodiments, the first beacon 135-*a* and/or the second beacon 135-*b* may generate a credential for a network based on the identified network-access boundary associated with each beacon. For example, the first beacon 135-*a* may generate a credential for the network based at least in part on the first portion 110-*a* network-access boundary. Alternatively, the second beacon 135-*b* may generate a credential for the network based at least in part on the second portion 110-*b* network access boundary. In one embodiment, the first beacon 135-*a* and/or the second beacon 135-*b* may store in memory the generated credential. Additionally, the first beacon 135-*a* and/or the second beacon 135-*b* may transmit the generated credential to the AP 105-*a* via communication links 125-*a* and/or 125-*d*.

In some embodiments, the AP 105-*a* may transmit a network credential to the first beacon 135-*a* within the first portion 110-*a* network-access boundary, via communication link 125-*d*. Additionally or alternatively, the AP 105-*a* may transmit network credential 205-*a* directly to UE 115-*e* via communication link 125-*e*. In some embodiments, the AP 105-*a* may transmit a network credential to the second beacon 135-*b* within the second portion 110-*b* network-access boundary, via communication link 125-*a*.

In one embodiment, the UE 115-*a* and/or the UE 115-*b* may transmit a request to access the network associated with the location. For example, a first customer seated at a coffee shop that is within the first portion 110-*a* of the network-access boundary, may request to access the Wi-Fi offered by the coffee shop via his mobile device (e.g., UE 115-*a*). Additionally, a second customer seated at the coffee shop that is within the first portion 110-*a* of the network-access boundary, may request to also access the Wi-Fi offered by the coffee shop via his mobile device (e.g., UE 115-*b*). In one embodiment, the AP 105-*a* may receive the request from the UE 115-*a* requesting to access the network via communication link 125-*e*. Alternatively, in one embodiment, the first beacon 135-*a* may receive the request from the UE 115-*b* requesting to access the network via communication link 125-*b*. The AP 105-*a* may transmit the network credential 205-*a* to the UE 115-*a* via communication link 125-*e*. The first beacon 135-*a* may transmit the network credential 205-*b* to the UE 115-*b* via communication link 125-*b*. In one embodiment, the network credential 205-*a* may be different from the network credential 205-*b*. In other embodiments, the network credential 205-*a* may match the network credential 205-*b*.

In some embodiments, the UE 115-*d* may transmit a request to access the network associated with the location. For example, another customer seated at the coffee shop that is within the second portion 110-*a* of the network-access boundary, may request to access the Wi-Fi offered by the coffee shop via his mobile device (e.g., UE 115-*d*). The second beacon 135-*b* may receive the request from the UE 115-*d* and transmit a network credential 205-*d* to the UE 115-*d* via communication link 125-*c*. In some embodiments, the network credential 205-*d* may be, but is not limited to, being different from the network credential 205-*a* and/or 205-*b*, or match a portion of the network credential 205-*a* and/or 205-*b*.

In some embodiments, a UE, e.g., UE 115-*c*, may be within an overlap of two coverage area (e.g., a first portion 110-*a* network-access boundary associated with the first beacon 135-*a*, and a second portion 110-*b* network-access boundary associated with the second beacon 135-*b*). As a result, the UE (i.e., UE 115-*c*) within the overlapped geographical coverage area may receive two network credentials associated with the beacons, i.e., the first beacon 135-*a* and the second beacon 135-*b*. In some embodiments, the first beacon 135-*a*, the second beacon 135-*b* and/or the AP 105-*a* may determine a location of the UE 115-*c* based at least in part on global positioning system (GPS) coordinates of the UE. As a result, the first beacon 135-*a*, or the second beacon 135-*b*, or the AP 105-*a* may transmit a network credential to the UE 115-*c* based at least in part on a distance between the UE 115-*c* and the first beacon 135-*a*, or the second beacon 135-*b*, or the AP 105-*a*. In some embodiments, the distance may be a threshold distance. For example, a distance between UE 115-*c* and the second beacon 135-*b* may be within a threshold distance (e.g., 10 ft.). Therefore, the second beacon 135-*b* may transmit network credential 205-*c* to the UE 115-*c*.

In some embodiments, the first beacon 135-*a*, the second beacon 135-*b* and/or the AP 105-*a* may determine a location of the UE 115-*c* based at least in part on Wi-Fi trilateration. In some embodiments, an AP may transmit a request for a determination of a location of a UE. In some embodiments, the AP may transmit the request to one or more beacons located within the network-access boundary. In some embodiments, the request may include UE information (e.g., identifier, address). A beacon may receive the request and analyze information associated with the request. For example, a beacon may compare information included in the request to a database of identifiers associated with previous and current UEs that communicated with the beacon. In some embodiments, the comparison may indicate whether the beacon has transmitted a network access credential to the UE associated with the request. In other embodiments, if the comparison indicates that the beacon has transmitted a network access credential to the UE, the beacon may determine whether the UE is still within a corresponding network access boundary of the beacon. For example, the beacon may determine that the UE is within the network access boundary of the beacon based at least in part on received heartbeat signals from the UE.

In some embodiments, the AP 105-*a*, the first beacon 135-*a*, and/or the second beacon 135-*b* may receive a location of a UE (e.g., UE 115-*c*) based at least in part on sensor data from one or more sensors (not shown) located at the location associated with the network-access boundary. The one or more sensors may include, but is not limited to, a camera sensor, a Wi-Fi positioning system sensor, a radio frequency sensor, a near-field sensor, motion sensors, other types of sensors, or a combination thereof. For example, a structure (e.g., coffee shop) may have a camera sensor that monitors the network-access boundary (i.e., perimeter of the coffee shop). In some embodiments, the camera sensor may monitor and report a location of a UE within the structure to the AP 105-*a*, the first beacon 135-*a* and/or the second beacon 135-*b*. As a result, the AP 105-*a*, the first beacon 135-*a* and/or the second beacon 135-*b* may evaluate the network access credential associated with the UE based on the location of the UE received from the camera sensor.

In some embodiments, the first beacon 135-*a* may generate an encryption key associated with a network access credential for the first portion 110-*a* network-access boundary. In further embodiments, the second beacon 135-*b* may generate an encryption key associated with a network access credential for the second portion 110-*b* network-access boundary. In some cases, the first beacon 135-*a* and/or the second beacon 135-*b* may receive same and/or different encryption keys from the AP 105-*a*. A requesting UE (e.g., UE 115-*a* and/or UE 115-*d*) may receive a network access credential and an encryption key for encrypting outbound network traffic from the UE to an AP based at least in part on a beacon associated with the UE. As a result, UE 115-*a* network traffic may be encrypted based at least in part on an encryption key associated with the first beacon 135-*a*, and UE 115-*d* network traffic may be encrypted based at least in part on an encryption key associated with the second beacon 135-*b*. As a result, UE 115-*a* network traffic may be prevented from intrusion and restricting other user devices (i.e., outside the network-access boundary (UE 115-*d*)) from capturing the UE 115-*a*'s traffic.

Figure 3:
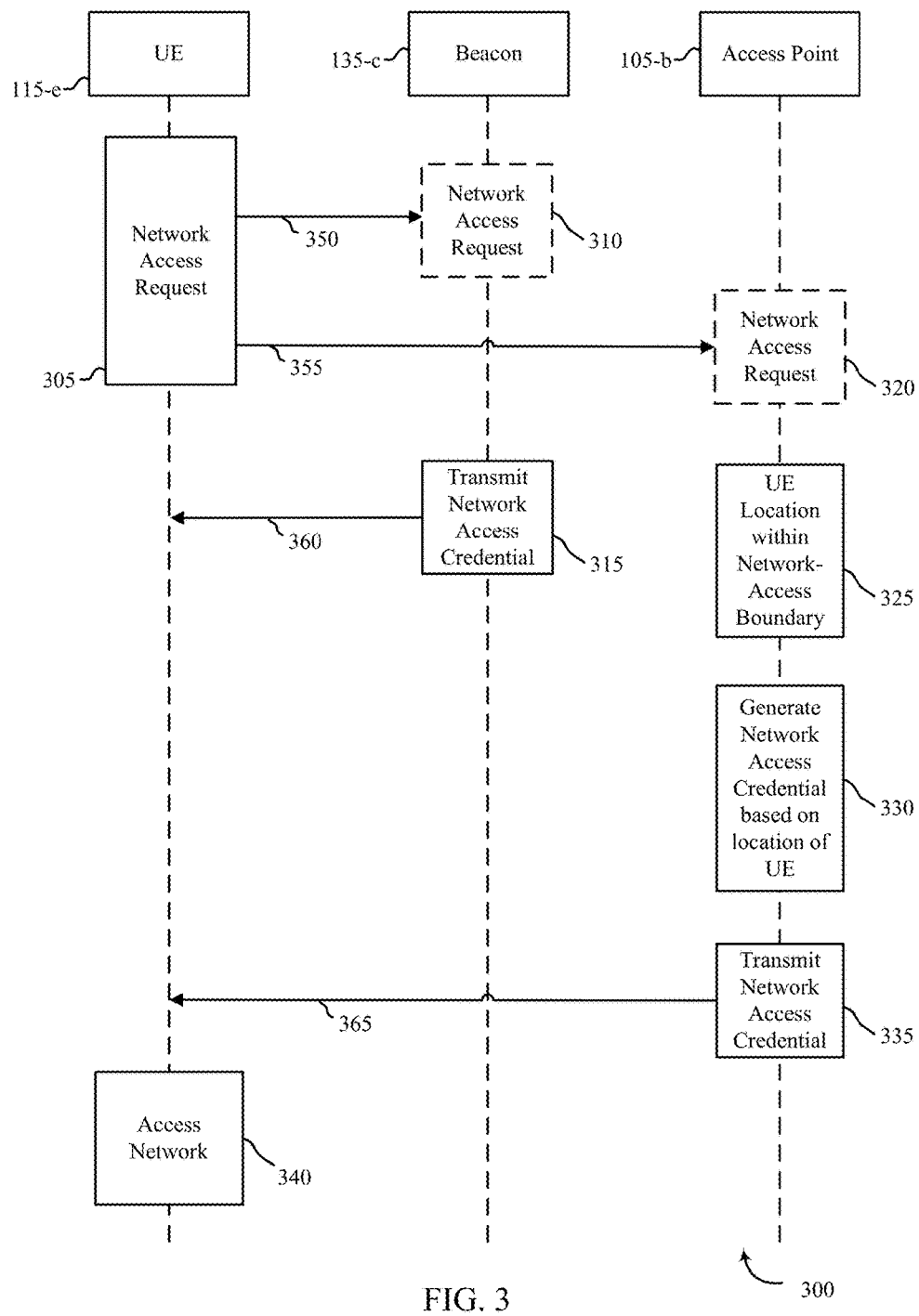
FIG. 3 illustrates an example of a process flow that supports techniques for network security in accordance with aspects of the present disclosure.

FIG. 3 illustrates an example of a process flow 300 that supports techniques for network security in accordance with aspects of the present disclosure. Process flow 300 may include UE 115-*e*, beacon 135-*c*, and AP 105-*b*, which may be examples of the corresponding devices described with reference to FIG. 1-2.

At block 305, the UE 115-*e* may transmit a network access request to the beacon 135-*c* via communication link 350 and/or to the AP 105-*b* via communication link 355. In some embodiments, the network access request may be during an uplink transmission. In some embodiments, the request may include channel information between the UE 115-*e* and the beacon 135-*c* and/or AP 105-*b*. For example, the channel information may indicate that signal quality (e.g., strength) between the UE 115-*e* and the AP 105-*b* is stronger compared to the signal quality between the UE 115-*e* and the beacon 135-*c*. In some embodiments, the beacon 135-*c* may receive the network access request 310 and/or the AP 105-*b* may receive the network access request 320. In some embodiments, the AP 105-*b* may measure a quality between the UE 115-*e* and other potential links, including communication with the beacon 135-*c*. At block 315, the beacon 135-*c* may transmit a network access credential to the UE 115-*e* via communication link 360. In some embodiments, the network access credential may be a WPA2 credential.

At block 325, the AP 105-*b* may determine a location of the UE, as described elsewhere herein. For example, AP 105-*b* may receive a location of the UE 115-*e* based at least in part on the request received from the UE 115-*e*. In some embodiments, the AP 105-*b* may detect that the location of the UE is external to a network-access boundary associated with the beacon 135-*c*. In some embodiments, the AP 105-*b* may detect that the location of the UE is external to a network-access boundary for a predetermined duration, e.g., 5 minutes. In some embodiments, the predetermined duration may be preassigned by an administrator of the network. For example, a coffee shop may have beacons (i.e., beacons 135-*c*) located at each table of the coffee shop that communicate with an AP (i.e., AP 105-*b*) for providing access (e.g., credentials) to a Wi-Fi network. A visiting customer of the coffee shop may place his order with the barista and seat himself at one of the tables. The visiting customer may then access the Wi-Fi network via his mobile device based on credentials received from a beacon at his table and/or an AP. After some duration, the visiting customer may leave his table to retrieve his order from the barista. If the visiting customer is absent from his table for a period that exceeds a predetermined threshold (e.g., 5 minutes), the connection between the mobile device of the visiting customer and the AP 105-*b* may be discontinued. In some embodiments, a beacon may receive interval heartbeat signals (e.g., every n seconds, n minutes where n is a positive integer) from a mobile device associated with the beacon. For example, a user may request credentials for accessing a network from an AP and/or beacon via his mobile device. The AP and/or beacon may transmit a credential to the user's mobile device and associate the mobile device with the AP and/or beacon. Based on the association the AP and/or the beacon may monitor the mobile device based at least in part on received heartbeat signals from the mobile device. In some embodiments, the AP and/or the beacon may discontinue a credential provided to a user device based at least in part on a failure to receive a heartbeat signal from the user device.

At block 330, AP 105-*b* may generate a network access credential based at least in part on the location of the UE 115-*e*. For example, in some embodiments, the AP 105-*b* may determine that the mobile device of the visiting customer is still within the network-access boundary of the coffee shop. At block 335, AP 105-*b* may transmit the network access credential to the UE 115-*e* via communication link 365. For example, the AP 105-*b* may generate a new credential and transmit the new credential to the mobile device of the visiting customer based on determining that the mobile device is still within the network-access boundary of the coffee shop. At block 340, UE 115-*e* may access the network. In one embodiment, the network may be a WLAN network, for example, Wi-Fi.

Figure 4:
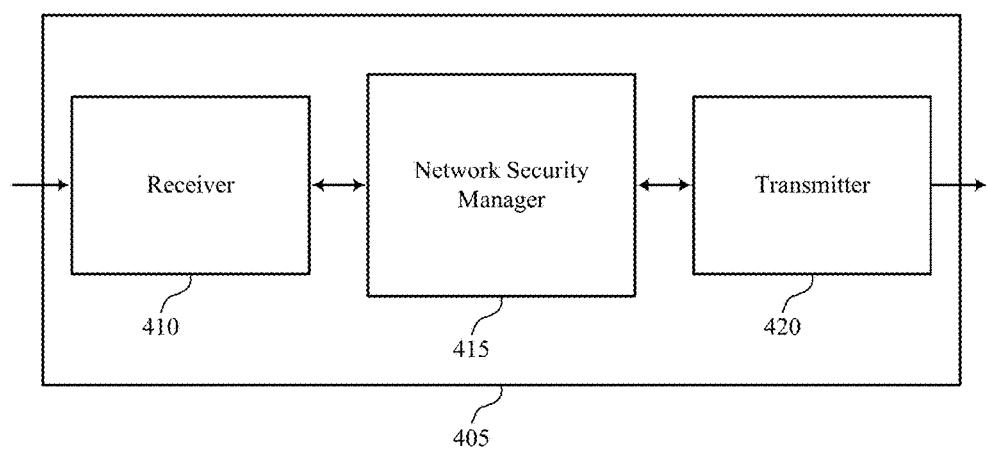
FIG. 4 illustrates a block diagram of a device that supports techniques for network security in accordance with aspects of the present disclosure.

FIG. 4 illustrates a block diagram 400 of a device 405 that supports techniques for network security in accordance with aspects of the present disclosure. Device 405 may be an example of aspects AP 105 and/or beacons 135 as described with reference to FIGS. 1 through 3. Device 405 may include receiver 410, a network security manager 415, and a transmitter 420. Device 405 may also include a processor. Each of these components may be in communication with one another (e.g., via one or more buses).

Receiver 410 may receive information such as packets, user data, or control information associated with various information channels (e.g., control channels, data channels, and information related to techniques for network security, network access requests, etc.). Information may be passed on to other components of the device. The receiver 10 may be an example of aspects of the transceiver 735 described with reference to FIG. 7.

Network security manager 415 may be an example of aspects of the network security manager 715 described with reference to FIG. 7. Network security manager 415 may identify a network-access boundary associated with a network for a location, generate a credential for the network based on the identified network-access boundary, receive a request from a UE to access the network associated with the location, and transmit the credential associated with the network based on the network-access boundary.

Transmitter 420 may transmit signals generated by other components of the device 405. In some embodiments, the transmitter 420 may be collocated with a receiver 410 in a transceiver module. For example, the transmitter 420 may be an example of aspects of the transceiver 735 described with reference to FIG. 7. The transmitter 420 may include a single antenna, or it may include a set of antennas.

Figure 5:
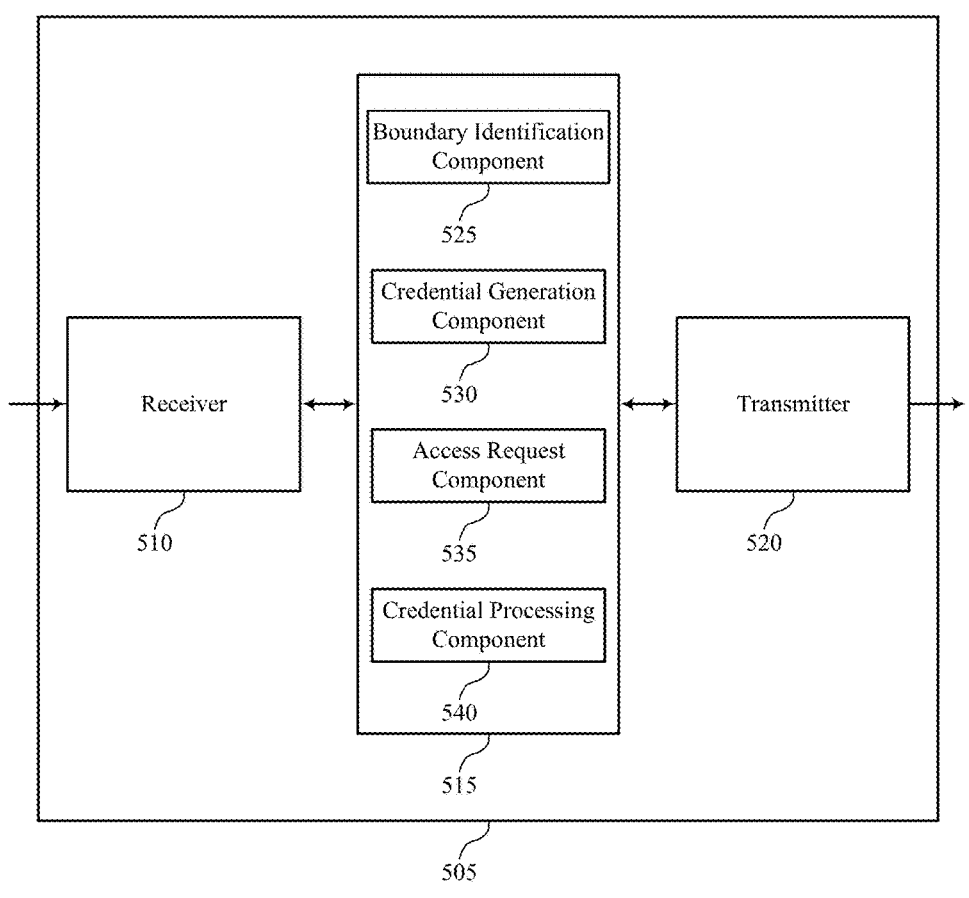
FIG. 5 illustrates a block diagram of a device that supports techniques for network security in accordance with aspects of the present disclosure.

FIG. 5 illustrates a block diagram 500 of a device 505 that supports techniques for network security in accordance with aspects of the present disclosure. Device 505 may be an example of aspects of a device 405 or AP 105 and/or beacon 135 as described with reference to FIGS. 1 through 4. Device 505 may include receiver 510, network security manager 515, and transmitter 520. Device 505 may also include a processor. Each of these components may be in communication with one another (e.g., via one or more buses).

Receiver 510 may receive information such as packets, user data, or control information associated with various information channels (e.g., control channels, data channels, and information related to techniques for network security, security credentials, network access keys, etc.). Information may be passed on to other components of the device. The receiver 510 may be an example of aspects of the transceiver 735 described with reference to FIG. 7.

Network security manager 515 may be an example of aspects of the network security manager 715 described with reference to FIG. 7. Network security manager 515 may also include boundary identification component 525, credential generation component 530, access request component 535, and credential processing component 540.

Boundary identification component 525 may identify a network-access boundary associated with a network for a location. In some embodiments, the boundary identification component 525 may determine a set of network-access boundaries of one or more beacons associated with a location. The one or more beacons may receive a network credential associated with a network accessible by an AP. In some embodiments, the one or more beacons may provide the network credential to one or more UEs that are within the network-access-boundary. In some cases, one or more of the network-access boundaries overlap as described elsewhere herein.

Credential generation component 530 may generate a credential for the network based on the identified network-access boundary. In some embodiments, the credential generation component 530 may generate a set of credentials associated with the network for the network-access boundary. For example, AP 105 may generate a set of credentials for a plurality of beacons associated with the network-access boundary. In some embodiments, each credential of the set may be different based on a location of a beacon. In other embodiments, each credential of the set may be the same regardless of the location of the beacon. In other embodiments, the credential generation component 530 may generate a set of credentials for each network-access boundary based on a perimeter of the network-access boundary as described elsewhere herein. In some cases, the credential is a Wi-Fi Protected Access-2 (WPA2) credential.

In some embodiments, the credential generation component 530 may generate an encryption key associated with a network access credential. A requesting UE may receive a network access credential and an encryption key for encrypting outbound network traffic from the UE to an AP. In some embodiments, the credential generation component 530 may generate an encryption key associated with a network access credential for each beacon at a location. The credential generation component 530 may allow all and/or a portion of the network traffic to be encrypted independently preventing both intrusion and restricting other user devices (i.e., outside the network-access boundary) from capturing the user's traffic.

Access request component 535 may receive a request from a UE to access the network associated with the location. For example, a visiting customer to a coffee shop may place his order with the barista and seat himself at a table including a beacon. In some cases, the beacon may be embedded in the table and/or another object associated with a network-access boundary. The visiting customer may request access to a Wi-Fi network offered by the coffee shop via his mobile device. The beacon and/or AP may receive the request form the customers mobile device. As a result, the beacon and/or AP may transmit a credential for accessing the Wi-Fi network to the mobile device.

In some embodiments, credential processing component 540 may transmit the credential associated with the network based on the network-access boundary. In some embodiments, the credential processing component 540 may determine a schedule associated with the set of credentials. In some cases, the credential processing component 540 may filter credentials for the network based at least in part on the schedule. For example, an AP 105 may exchange credentials between two or more beacons based on a schedule (e.g., every n minutes, n hours, n days where n is a positive integer). In some embodiments, the credential processing component 540 may discontinue the credential associated with the network-access boundary based on determining that the UE is external to the network-access boundary for a period exceeding the predetermined duration. In some cases, the credential processing component 540 may reject network traffic from a user device based at least in part on determining that the user device is outside the network-access boundary.

In further embodiments, the credential processing component 540 may exchange the set of credentials between the network-access boundaries of the one or more beacons based on a predetermined rule. A predetermined rule may include, but is not limited to, a predetermined sequence, or a predetermined duration, or a combination thereof. In some embodiments, the credential processing component 540 may encrypt each credential prior to exchanging the credentials between the beacons based on a security protocol.

Transmitter 520 may transmit signals generated by other components of the device. In some embodiments, the transmitter 520 may be collocated with a receiver 510 in a transceiver module. For example, the transmitter 520 may be an example of aspects of the transceiver 735 described with reference to FIG. 7. The transmitter 520 may include a single antenna, or it may include a set of antennas.

Figure 6:
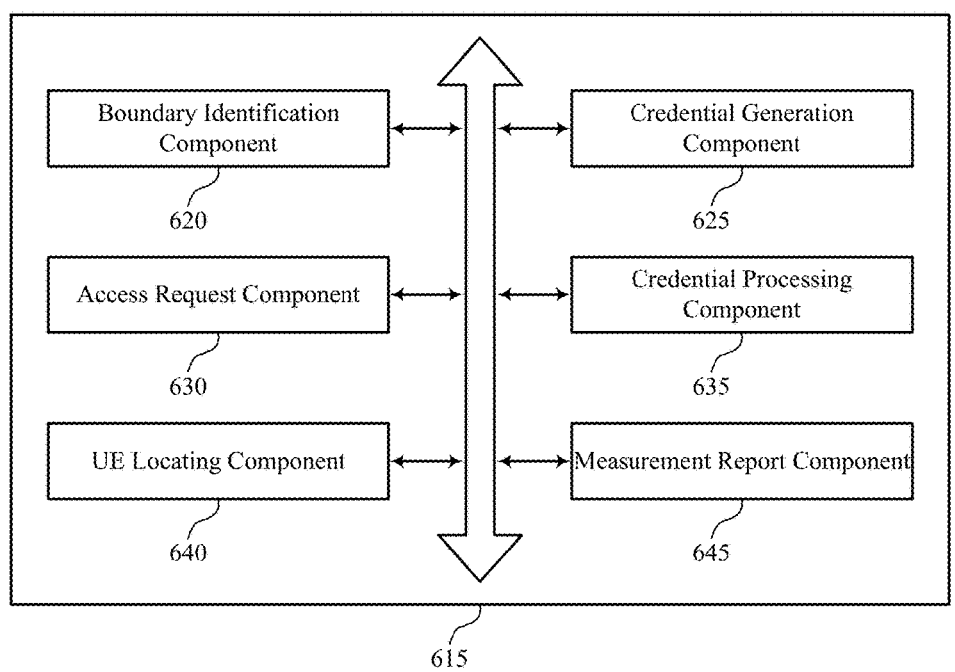
FIG. 6 illustrates a block diagram of a network security manager that supports techniques for network security in accordance with aspects of the present disclosure.

FIG. 6 illustrates a block diagram 600 of a network security manager 615 that supports techniques for network security in accordance with aspects of the present disclosure. The network security manager 615 may be an example of aspects of a network security manager 415, a network security manager 515, or a network security manager 715 described with reference to FIGS. 4, 5, and 7. The network security manager 615 may include boundary identification component 620, credential generation component 625, access request component 630, credential processing component 635, UE locating component 640, and measurement report component 645. Each of these modules may communicate, directly or indirectly, with one another (e.g., via one or more buses).

Boundary identification component 620 may identify a network-access boundary associated with a network for a location. In some embodiments, the boundary identification component 620 may determine a set of network-access boundaries of one or more beacons associated with a location. For example, a network-access boundary may be, but is not limited to, a predetermined coverage area (i.e., geographic coverage area 110) in which an AP 105 may provide access to a network, e.g., WLAN network, accessible by one or more UEs 115 that are within the predetermined coverage area. For example, an AP located at a structure, e.g., a coffee shop may identify a network-access boundary as a perimeter of the structure. In some cases, the network-access boundary may have a predetermined radius (not shown). In some cases, one or more of the network-access boundaries may overlap.

Credential generation component 625 may generate a credential for the network based on the identified network-access boundary. In some embodiments, the credential generation component 625 may generate a set of credentials for each network-access boundary based on a perimeter of the network-access boundary. In some embodiments, the AP 105 and/or beacon 135 may generate a credential, e.g., WPA2 credentials, for the network based at least in part on the identified network-access boundary. In some embodiments, the AP 105 and/or the beacon 135 may generate a credential based at least in part on a perimeter associated with a portion of a network-access boundary, as described elsewhere herein. In one embodiment, the beacon 135 may store in memory the generated credential. Additionally, the beacon 135 may transmit the generated credential to the AP 105. In some embodiments, the credential generation component 625 may generate a set of credentials associated with the network for the network-access boundary. For example, an AP 105 may generate a set of credentials for a plurality of beacons (e.g., beacons 135) and transmit the set of credentials to the beacons. In some embodiments, an AP may generate different sets of credentials for different beacons of the plurality of beacons. In some embodiments, a beacon may generate a set of credentials associated with the network for the network-access boundary and report the set of credentials to the AP.

In some embodiments, the credential generation component 625 may determine a schedule associated with the set of credentials. For example, in one embodiment, an AP 105 may determine a schedule for the AP 105 and/or the beacons 135 to filter between credentials of the set. In other embodiments, the beacons 135 may determine a schedule associated with the set of credentials and filter between credentials of the set. In some embodiments, the beacons may report an active credential to the AP 105 responsive to filtering a credential. In some cases, the credential is a Wi-Fi Protected Access-2 (WPA2) credential.

In some embodiments, the credential generation component 625 may generate an encryption key associated with a network access credential. A requesting UE may receive a network access credential and an encryption key for encrypting outbound network traffic from the UE to an AP. In some embodiments, the credential generation component 625 may generate an encryption key associated with a network access credential for each beacon at a location. As a result, the credential generation component 625 may allow all and/or a portion of the network traffic to be encrypted independently preventing both intrusion and restricting other user devices (i.e., outside the network-access boundary) from capturing the user's traffic.

Access request component 630 may receive a request from a UE to access the network associated with a location. For example, a visiting customer to a coffee shop may place his order with the barista and seat himself at one of the tables. The table may include a beacon that may be embedded to the table. The visiting customer may request access to a Wi-Fi network offered by the coffee shop via his mobile device. The beacon and/or AP may receive the request from the customer's mobile device. As a results, the beacon and/or AP may transmit a credential for accessing the Wi-Fi network to the mobile device.

In some embodiments, credential processing component 635 may transmit a credential associated with a network based on a network-access boundary. In some embodiments, the credential processing component 635 may discontinue the credential associated with the network-access boundary based on determining that the UE is external to the network-access boundary for a period exceeding the predetermined duration. For example, a coffee shop may have beacons (i.e., beacons 135) located at each table of the coffee shop that communicate with an AP (i.e., AP 105) for providing access (e.g., credentials) to a Wi-Fi network. A visiting customer of the coffee shop may place his order with the barista and seat himself at one of the tables. The visiting customer may then access the Wi-Fi network via his mobile device based on credentials received from a beacon at his table. After some duration, the visiting customer may leave his table to retrieve his order from the barista. If the visiting customer is absent from his table for a period that exceeds a predetermined threshold (e.g., 5 minutes), the connection between the mobile device of the visiting customer and the AP may be discontinued. In some embodiments, if the visiting customer returns to his table before the predetermined threshold, the connection to the Wi-Fi network may be continued.

In some embodiments, the credential processing component 635 may filter the credential for the network based on a schedule and/or exchange the set of credentials between the network-access boundaries of the one or more beacons based on the schedule. In some cases, the credential processing component 635 may encrypt each credential prior to the exchanging based on a security protocol. In some embodiments, network traffic (e.g., data, content) associated with the UE may be encrypted based at least in part on the received network credential from an AP and/or beacon.

UE locating component 640 may determine a location of the UE. In some embodiments, UE locating component 640 may detect that the location of the UE is external to the network-access boundary. In some case, the UE locating component 640 may determine whether the UE is external to the network-access boundary for a predetermined duration based on the location of the UE. In some cases, the location of the UE is determined based on GPS coordinates of the UE.

Measurement report component 645 may perform a measurement procedure of one or more beacons. In some embodiments, the measurement report component 645 may transmit a measurement report to an AP and/or beacon. In some cases, the report is based on the measurement procedure. In further embodiments, the measurement report component 645 may modify a perimeter associated with the one or more network-access boundaries based on the measurement report.

Figure 7:
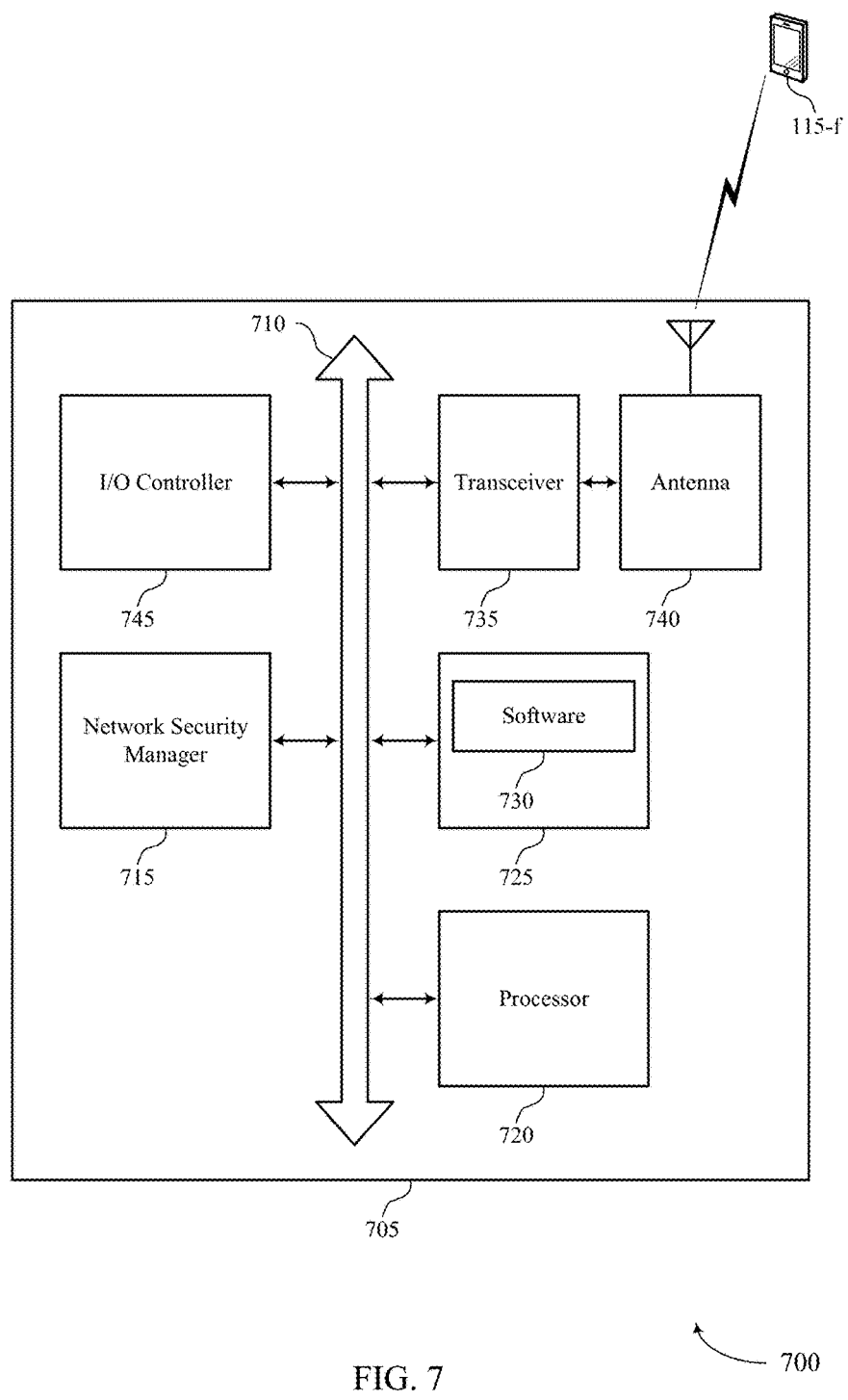
FIG. 7 illustrates a block diagram of a system including a device that supports techniques for network security in accordance with aspects of the present disclosure.

FIG. 7 illustrates a block diagram of a system 700 including a device 705 that supports techniques for network security in accordance with aspects of the present disclosure. Device 705 may be an example of or include the components of device 405, device 505, AP 105, or beacon 135 as described above, e.g., with reference to FIGS. 1, 2, 4, and 5. Device 705 may include components for bi-directional voice and data communications including components for transmitting and receiving communications, including network security manager 715, processor 720, memory 725, software 730, transceiver 735, antenna 740, and I/O controller 745.

Processor 720 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some embodiments, processor 720 may be configured to operate a memory array using a memory controller. In some embodiments, a memory controller may be integrated into processor 720. Processor 720 may be configured to execute computer-readable instructions stored in a memory to perform various functions (e.g., functions or tasks supporting techniques for network security) 720.

Memory 725 may include random access memory (RAM) and read only memory (ROM). The memory 725 may store computer-readable, computer-executable software 730 including instructions that, when executed, cause the processor to perform various functions described herein. In some embodiments, the memory 725 may contain, among other things, a Basic Input-Output system (BIOS) which may control basic hardware and/or software operation such as the interaction with peripheral components or devices.

Software 730 may include code to implement aspects of the present disclosure, including code to support techniques for network security. Software 730 may be stored in a non-transitory computer-readable medium such as system memory or other memory. In some embodiments, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some embodiments, the device 705 may include a single antenna 740. However, in some embodiments, the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some embodiments, I/O controller 745 may represent a physical connection or port to an external peripheral. In further embodiments, I/O controller 745 may utilize an operating system such as iOS®, ANDROID®, MS-DOS®, MS-WINDOWS®, OS/2®, UNIX®, LINUX®, or another known operating system.

Figure 8:
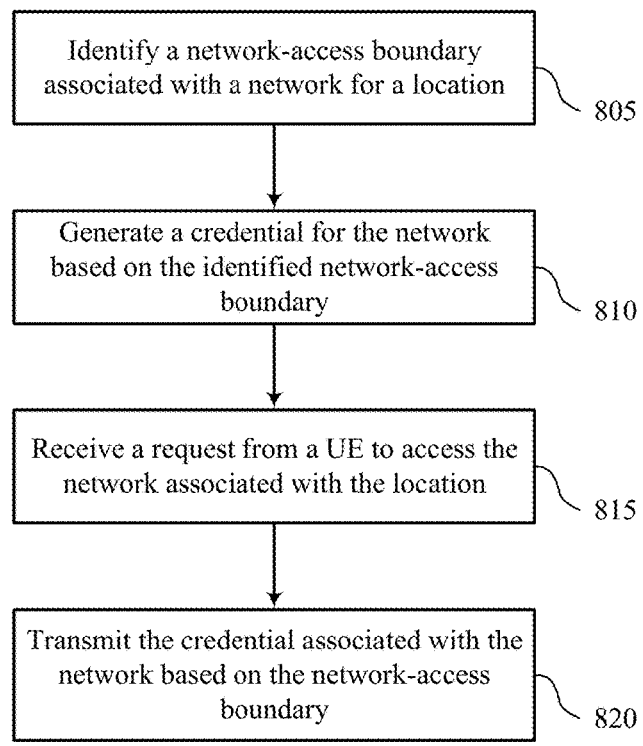
FIG. 8 is a flow chart illustrating an example of a method for network security, in accordance with various aspects of the present disclosure.

FIG. 8 is a flow chart illustrating an example of a method 800 for techniques for network security in accordance with various aspects of the present disclosure. For clarity, the method 800 is described below with reference to a wireless communication device including aspects of one or more APs 105 described with reference to FIGS. 1, 2, 3, and 7, one or more beacons 135 described with reference to FIGS. 1, 2, 3, and 7. For example, the operations of method 800 may be performed by a network security manager as described with reference to FIGS. 4 through 7. In some embodiments, a wireless communication device may execute one or more sets of codes to control the functional elements of the wireless communication device to perform the functions described below. Additionally or alternatively, the wireless communication device may perform one or more of the functions described below using special-purpose hardware.

At block 805, the method may include identifying a network-access boundary associated with a network for a location as described with reference to FIGS. 1 through 6. The operation at block 805 may be performed using the network security manager 415, 515, or 715 described with reference to FIG. 4, 5, or 7. In one embodiment, the operation at block 905 may be performed by the boundary identification component 525 or 620 described with reference to FIG. 5 or 6.

At block 810, the method may include generating a credential for the network based on the identified network-access boundary as described with reference to FIGS. 1 through 6. The operation at block 810 may be performed using the network security manager 415, 515, or 715 described with reference to FIG. 4, 5, or 7. In one embodiment, the operation at block 810 may be performed by the credential generation component 530 or 625 described with reference to FIG. 5 or 6.

At block 815, the method may include receiving a request from a UE to access the network associated with the location as described with reference to FIGS. 1 through 6. The operation at block 815 may be performed using the network security manager 415, 515, or 715 described with reference to FIG. 4, 5, or 7. In one embodiment, the operation at block 815 may be performed by the access request component 535 or 630 described with reference to FIG. 5 or 6.

At block 820, the method may include transmitting the credential associated with the network based at least in part on the network-access boundary as described with reference to FIGS. 1 through 6. The operation at block 820 may be performed using the network security manager 415, 515, or 715 described with reference to FIG. 4, 5, or 7. In one embodiment, the operation at block 820 may be performed by the credential processing component 540 or 635 described with reference to FIG. 5 or 6.

Thus, the method 800 may provide network security for wireless communication. It should be noted that the method 800 is just one implementation and that the operations of the method 800 may be rearranged or otherwise modified such that other implementations are possible.

Figure 9:
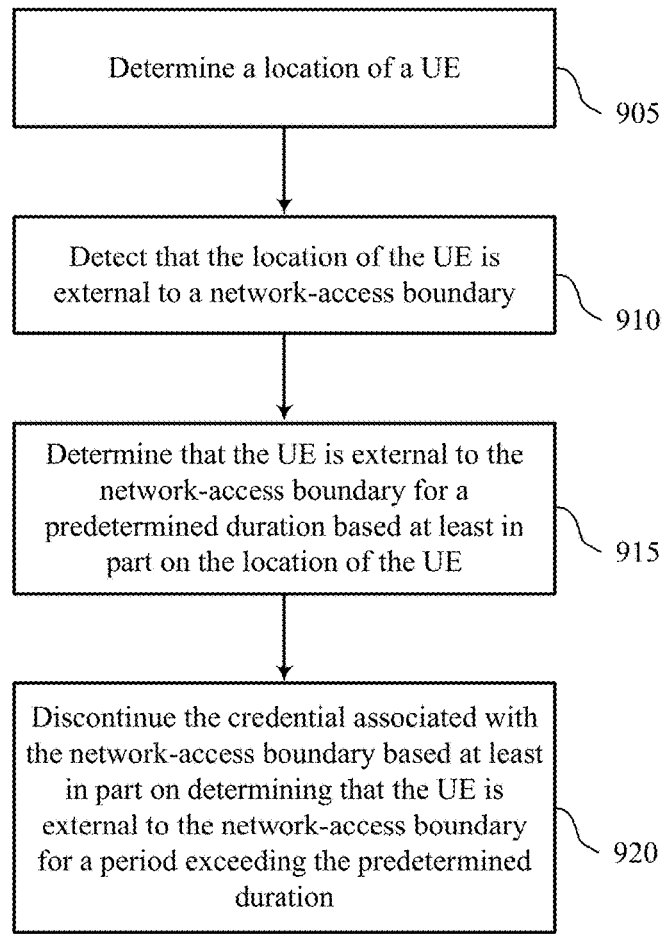
FIG. 9 is a flow chart illustrating an example of a method for network security, in accordance with various aspects of the present disclosure.

FIG. 9 is a flow chart illustrating an example of a method 900 for techniques for network security in accordance with various aspects of the present disclosure. For clarity, the method 900 is described below with reference to a wireless communication device including aspects of one or more APs 105 described with reference to FIGS. 1, 2, 3, and 7, one or more beacons 135 described with reference to FIGS. 1, 2, 3, and 7. For example, the operations of method 900 may be performed by a network security manager as described with reference to FIGS. 4 through 7. In some embodiments, a wireless communication device may execute one or more sets of codes to control the functional elements of the wireless communication device to perform the functions described below. Additionally or alternatively, the wireless communication device may perform one or more of the functions described below using special-purpose hardware.

At block 905, the method may include determining a location of a UE as described with reference to FIGS. 1 through 6. In one embodiment, AP 105 and/or beacon 135 may determine a location of a UE based at least in part on GPS coordinates received from the UE. The operation at block 905 may be performed using the network security manager 415, 515, or 715 described with reference to FIG. 4, 5, or 7. In some embodiments, the operation at block 905 may be performed by the UE locating component 640 described with reference to FIG. 6.

At block 910, the method may include detecting that the location of the UE is external to a network-access boundary as described with reference to FIGS. 1 through 6. The operation at block 910 may be performed using the network security manager 415, 515, or 715 described with reference to FIG. 4, 5, or 7. In one embodiment, the operation at block 910 may be performed by the UE locating component 640 described with reference to FIG. 6. In some embodiments, the operation at block 910 may be performed by the boundary identification component 525 or 620 described with reference to FIG. 5 or 6.

At block 915, the method may include determining that the UE is external to the network-access boundary for a predetermined duration based at least in part on the location of the UE as described with reference to FIGS. 1 through 6. The operation at block 915 may be performed using the network security manager 415, 515, or 715 described with reference to FIG. 4, 5, or 7. In one embodiment, the operation at block 910 may be performed by the UE locating component 640 described with reference to FIG. 6. In some embodiments, the operation at block 915 may be performed by the boundary identification component 525 or 620 described with reference to FIG. 5 or 6.

At block 920, the method may include discontinuing the credential associated with the network-access boundary based at least in part on determining that the UE is external to the network-access boundary for a period exceeding the predetermined duration as described with reference to FIGS. 1 through 6. A predetermined duration may include, but is not limited to, seconds, minutes, etc. In some embodiments, the predetermined duration may be preassigned by an administrator of the network. For example, a coffee shop may have beacons (i.e., beacons 135) located at each table of the coffee shop that communicate with an AP (i.e., AP 105) for providing access (e.g., credentials) to a Wi-Fi network. A visiting customer of the coffee shop may place his order with the barista and seat himself at one of the tables. The visiting customer may then access the Wi-Fi network via his mobile device based on credentials received from a beacon at his table. After some duration, the visiting customer may leave his table to retrieve his order from the barista. If the visiting customer is absent from his table for a period that exceeds a predetermined threshold (e.g., 5 minutes), the connection between the mobile device of the visiting customer and the AP may be discontinued. In some embodiments, if the visiting customer returns to his table before the predetermined threshold, the connection to the Wi-Fi network may be continued. The operation at block 920 may be performed using the network security manager 415, 515, or 715 described with reference to FIG. 4, 5, or 7. In one embodiment, the operation at block 920 may be performed by the UE locating component 640 described with reference to FIG. 6. In some embodiments, the operation at block 920 may be performed by the boundary identification component 525 or 620 described with reference to FIG. 5 or 6.

Thus, the method 900 may provide network security for wireless communication. It should be noted that the method 900 is just one implementation and that the operations of the method 900 may be rearranged or otherwise modified such that other implementations are possible.

Figure 10:
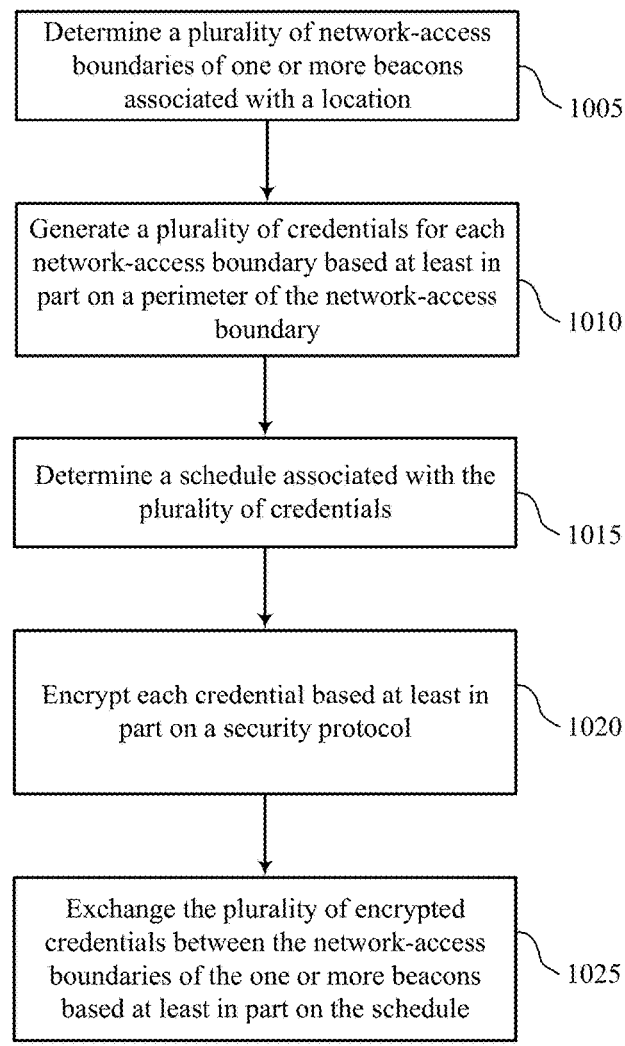
FIG. 10 is a flow chart illustrating an example of a method for network security, in accordance with various aspects of the present disclosure.

FIG. 10 is a flow chart illustrating an example of a method 1000 for techniques for network security in accordance with various aspects of the present disclosure. For clarity, the method 1000 is described below with reference to a wireless communication device including aspects of one or more APs 105 described with reference to FIGS. 1, 2, 3, and 7, one or more beacons 135 described with reference to FIGS. 1, 2, 3, and 7. For example, the operations of method 1000 may be performed by a network security manager as described with reference to FIGS. 4 through 7. In some embodiments, the method 1000 is described below with reference to a wireless communication device including aspects of one or more UEs 115 described with reference to FIG. 1, 2, or 7. In some embodiments, a wireless communication device may execute one or more sets of codes to control the functional elements of the wireless communication device to perform the functions described below. Additionally or alternatively, the wireless communication device may perform one or more of the functions described below using special-purpose hardware.

At block 1005, the method may include determining a plurality of network-access boundaries of one or more beacons associated with a location as described with reference to FIGS. 1 through 6. In some embodiments, the network-access boundary may be associated with a WLAN, for example, Wi-Fi. The operation at block 1005 may be performed using the network security manager 415, 515, or 715 described with reference to FIG. 4, 5, or 7. In some embodiments, the operation at block 1005 may be performed by the boundary identification component 525 or 620 described with reference to FIG. 5 or 6.

At block 1010, the method may include generating a plurality of credentials for each network-access boundary based at least in part on a perimeter of the network-access boundary as described with reference to FIGS. 1 through 6. The operation at block 1010 may be performed using the network security manager 415, 515, or 715 described with reference to FIG. 4, 5, or 7. In some embodiments, the operation at block 1010 may be performed by the credential generation component 530 or 625 described with reference to FIG. 5 or 6.

At block 1015, the method may include determining a schedule associated with the plurality of credentials as described with reference to FIGS. 1 through 6. The operation at block 1015 may be performed using the network security manager 415, 515, or 715 described with reference to FIG. 4, 5, or 7. In some embodiments, the operation at block 1015 may be performed by the credential processing component 540 or 635 described with reference to FIG. 5 or 6.

At block 1020, the method may include encrypting each credential based at least in part on a security protocol as described with reference to FIGS. 1 through 6. In one embodiment, a security protocol may include, but is not limited to, a Wi-Fi Protected Access-2 (WPA2) credential. The operation at block 1020 may be performed using the network security manager 415, 515, or 715 described with reference to FIG. 4, 5, or 7. In some embodiments, the operation at block 1020 may be performed by the credential processing component 540 or 635 described with reference to FIG. 5 or 6.

At block 1025, the method may include exchanging the plurality of encrypted credentials between the network-access boundaries of the one or more beacons based at least in part on the schedule as described with reference to FIGS. 1 through 6. The operation at block 1025 may be performed using the network security manager 415, 515, or 715 described with reference to FIG. 4, 5, or 7. In some embodiments, the operation at block 1025 may be performed by the credential processing component 540 or 635 described with reference to FIG. 5 or 6.

Thus, the method 1000 may provide network security for wireless communication. It should be noted that the method 1000 is just one implementation and that the operations of the method 1000 may be rearranged or otherwise modified such that other implementations are possible.

It should be noted that the methods described above describe possible implementations, and that the operations and the blocks may be rearranged or otherwise modified and that other implementations are possible. Furthermore, aspects from two or more of the methods may be combined. For example, aspects of the methods 800, 900, or 1000 described with reference to FIG. 8, 9, or 10 may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the embodiments that may be implemented or that are within the scope of the claims. The term "exemplary" used herein means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other embodiments and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the embodiments and designs described herein, but is to be accorded the broadest scope consistent with the principles and novel features disclosed herein.

What is claimed is:

1. A method for wireless network security, comprising:
   identifying a network-access boundary associated with a network for a location;
   generating a set of independently encrypted credentials for the network based at least in part on the identified network-access boundary, wherein each generated credential of the set of credentials comprises a different encrypted characteristic and is generated based at least in part on a location of at least one beacon associated with the network-access boundary;
   receiving a request from a user equipment (UE) to access the network associated with the location, the request comprising channel information between the UE and the network; and
   transmitting the credential associated with the network based at least in part on the network-access boundary.

2. The method of claim 1, further comprising:
   determining a location of the UE;
   detecting that the location of the UE is external to the network-access boundary; and
   determining whether the UE is external to the network-access boundary for a predetermined duration based at least in part on the location of the UE.

3. The method of claim 2, further comprising:
   discontinuing the credential associated with the network-access boundary based at least in part on determining that the UE is external to the network-access boundary for a period exceeding the predetermined duration.

4. The method of claim 2, wherein the location of the UE is determined based at least in part on global positioning system (GPS) coordinates of the UE.

5. The method of claim 1, further comprising:
   generating a plurality of credentials associated with the network for the network-access boundary;
   determining a schedule associated with the plurality of credentials; and
   filtering the credential for the network based at least in part on the schedule.

6. The method of claim 1, further comprising:
   determining a plurality of network-access boundaries of one or more beacons associated with a location; and
   generating a plurality of credentials for each network-access boundary based at least in part on a perimeter of the network-access boundary.

7. The method of claim 6, wherein one or more of the network-access boundaries overlap.

8. The method of claim 6, further comprising:
   exchanging the plurality of credentials between the network-access boundaries of the one or more beacons based at least in part on a predetermined rule.

9. The method of claim 8, wherein the predetermined rule comprises: any of a predetermined sequence, or a predetermined duration, or a combination thereof.

10. The method of claim 8, further comprising:
    encrypting each credential prior to the exchanging based at least in part on a security protocol.

11. The method of claim 6, further comprising:
    performing a measurement procedure of one or more beacons;
    transmitting a measurement report to an access point, wherein the report is based at least in part on the measurement procedure; and
    modifying a perimeter associated with the one or more network-access boundaries based at least in part on the measurement report.

12. The method of claim 1, wherein the credential is a Wi-Fi Protected Access-2 (WPA2) credential.

13. The method of claim 1, wherein the network is a wireless local area network (WLAN).

14. An apparatus for wireless network security, in a system comprising:
- a processor;
- memory in electronic communication with the processor; and
- instructions stored in the memory and operable, when executed by the processor, to cause the apparatus to:
  - identify a network-access boundary associated with a network for a location;
  - generate a set of independently encrypted credentials for the network based at least in part on the identified network-access boundary, wherein each generated credential of the set of credentials comprises a different encrypted characteristic and is generated based at least in part on a location of at least one beacon associated with the network-access boundary;
  - receive a request from a user equipment (UE) to access the network associated with the location, the request comprising channel information between the UE and the network; and
  - transmit the credential associated with the network based at least in part on the network-access boundary.

15. The apparatus of claim 14, wherein the instructions are further executable by the processor to:
- determine a location of the UE;
- detect that the location of the UE is external to the network-access boundary; and
- determine whether the UE is external to the network-access boundary for a predetermined duration based at least in part on the location of the UE.

16. The apparatus of claim 15, wherein the instructions are further executable by the processor to:
- discontinue the credential associated with the network-access boundary based at least in part on determining that the UE is external to the network-access boundary for a period exceeding the predetermined duration.

17. The apparatus of claim 15, wherein the location of the UE is determined based at least in part on global positioning system (GPS) coordinates of the UE.

18. The apparatus of claim 14, wherein the instructions are further executable by the processor to:
- generate a plurality of credentials associated with the network for the network-access boundary;
- determine a schedule associated with the plurality of credentials; and
- filter the credential for the network based at least in part on the schedule.

19. The apparatus of claim 14, wherein the instructions are further executable by the processor to:
- determine a plurality of network-access boundaries of one or more beacons associated with a location; and
- generate a plurality of credentials for each network-access boundary based at least in part on a perimeter of the network-access boundary.

20. A non-transitory computer readable medium storing code for wireless network security, the code comprising instructions executable by a processor to:
- identify a network-access boundary associated with a network for a location;
- generate a set of independently encrypted credentials for the network based at least in part on the identified network-access boundary, wherein each generated credential of the set of credentials comprises a different encrypted characteristic and is generated based at least in part on a location of at least one beacon associated with the network-access boundary;
- receive a request from a user equipment (UE) to access the network associated with the location, the request comprising channel information between the UE and the network; and
- transmit the credential associated with the network based at least in part on the network-access boundary.

* * * * *